United States Patent [19]

Inman

[11] 4,288,058
[45] Sep. 8, 1981

[54] COMPOSITE MOLD FOR MAKING RUBBER COVERED ROLLS AND METHOD FOR MAKING SAME

[75] Inventor: Hubert W. Inman, North Charleston, S.C.

[73] Assignee: Raybestos-Manhattan, Inc., Trumbull, Conn.

[21] Appl. No.: 76,403

[22] Filed: Sep. 17, 1979

[51] Int. Cl.³ .............................................. B28B 7/34
[52] U.S. Cl. .............................. 249/134; 249/114 R; 249/127; 264/127; 264/225; 264/262
[58] Field of Search ............... 264/127, 219, 225, 262, 264/DIG. 68; 249/113, 114, 127, 134

[56] References Cited

U.S. PATENT DOCUMENTS

| | | | |
|---|---|---|---|
| 2,724,864 | 11/1955 | Krotz | 249/83 |
| 3,325,434 | 6/1967 | Tully | 264/127 |
| 3,355,772 | 12/1967 | Kolberg | 249/96 |
| 3,619,446 | 11/1971 | Nauta | 264/DIG. 68 |
| 4,098,631 | 7/1978 | Stryjewski | 264/127 |
| 4,113,825 | 9/1978 | Hill et al. | 264/262 |

Primary Examiner—Donald E. Czaja
Assistant Examiner—W. Thompson
Attorney, Agent, or Firm—Gary, Juettner & Pyle

[57] ABSTRACT

A composite cylindrical mold for making rubber covered rolls comprises an outer rigid tube and an inner hollow cylindrical sleeve, with the space between the tube and the sleeve being filled with a cured elastomer. In preparing the mold, a heat shrinkable polytetrafluoroethylene tube etched on the outer surface is disposed around a rigid mandrel and heat shrunk thereon. The mandrel and sleeve are then inserted into the rigid tube in concentric relation. Curable rubber is then injected under pressure between the tube and the sleeve and the rubber is cured, causing the inner surface of the sleeve to conform exactly to the surface of the mandrel. The mandrel is then removed, and the inner surface of the sleeve is used as a molding surface for rubber covered rolls.

7 Claims, 2 Drawing Figures

COMPOSITE MOLD FOR MAKING RUBBER COVERED ROLLS AND METHOD FOR MAKING SAME

BACKGROUND OF THE INVENTION

Cylindrical rollers having a metal core and an elastomeric surface are used in a variety of applications, a typical application being in xerographic and electrophotographic duplicating machines. Such rolls are used to apply pressure and heat to a toner image on a substrate in order to fuse the image. In some instances, the rubber roll is covered with a polytetrafluoroethylene sleeve, and in other instances, the bare elastomer surface is desired.

The following United States patents relate to sleeved and unsleeved rubber rolls and methods and apparatus for making the same: U.S. Pat. Nos. 2,845,657; 2,864,130; 3,355,772; 3,380,120; 3,607,494; 3,613,168; 3,724,983; 3,912,901; 4,078,286; 4,083,092; 4,098,631; and 4,099,312.

A very important objective in the manufacture of rolls of the foregoing type is that the rolls have a near perfect concentricity of cylindrical surface as possible in which the diameter is constant along the axis thereof and the roll is free of surface irregularities. Heretofore, such precision has been possible primarily by injecting rubber into a seamless steel cylindrical mold having a precision formed inner surface. Such molds are, however, expensive to produce or acquire, and must be handled carefully in order to prevent damage to the molding surface. Also, in commercial scale production, a large number of such expensive molds are required because of the relatively long period required to cure rubber in a single mold, and also because various sizes of rolls must be produced.

In accordance with the conventional process for making a rubber covered roll, the core or shaft of the roll is usually coated with an adhesive or primer and is inserted into the metal mold and supported in concentric relation therewith. Uncured rubber is then injected into the space between the core and the mold. After the rubber is cured, the covered roll is withdrawn from the mold.

Under some conditions, a problem may arise wherein the injected rubber adheres to the mold surface, and a special operation is required to remove the roll, sometimes causing damage to the product. Such is particularly true with rubbers furnished in liquid form, such as certain silicone rubbers, which are injected under low pressure and then cured at room temperature or with the application of heat.

SUMMARY OF THE INVENTION

The present invention provides a highly precise mold of the foregoing nature that is inexpensive to make, durable, and provides excellent release from silicone or other rubbers cured therein. A mandrel is provided having a precisely concentric outer cylindrical surface corresponding to the desired diameter of the rubber covered roll. A tube or film of heat shrinkable polymeric material is heat shrunk around the mandrel. The covered mandrel is then inserted into a rigid tube or pipe having an inner diameter larger than the diameter of the covered mandrel. The ends of the assembly are capped to hold the covered mandrel in concentric relation with the rigid tube and to define a confined space. A curable polymer or elastomer is then pressure injected into the space between covered mandrel and rigid tube, causing the inside surface of the cover to conform even more exactly to the highly concentric surface of the mandrel. Upon curing of the injected polymer, the mandrel is withdrawn and may be used to make as many other molds as may be desired.

The resulting mold comprises a cylinder of rubber bonded on the outside surface to the rigid shell and on the inside surface to the polymer tube, which is preferably a material having a good release properties such as polytetrafluoroethylene.

Other advantages of the mold of the present invention and the method for making such mold will become apparent in the following description.

THE DRAWING

DESCRIPTION OF THE PREFERRED EMBODIMENT

As will be described herein in more detail, the mold of the present invention comprises an outer rigid cylinder, a tubular layer of cured elastomer bonded to the inner surface of the cylinder, and an inner tube of a polymer material having the outside surface thereof bonded to the cured elastomer layer.

Figure 1:
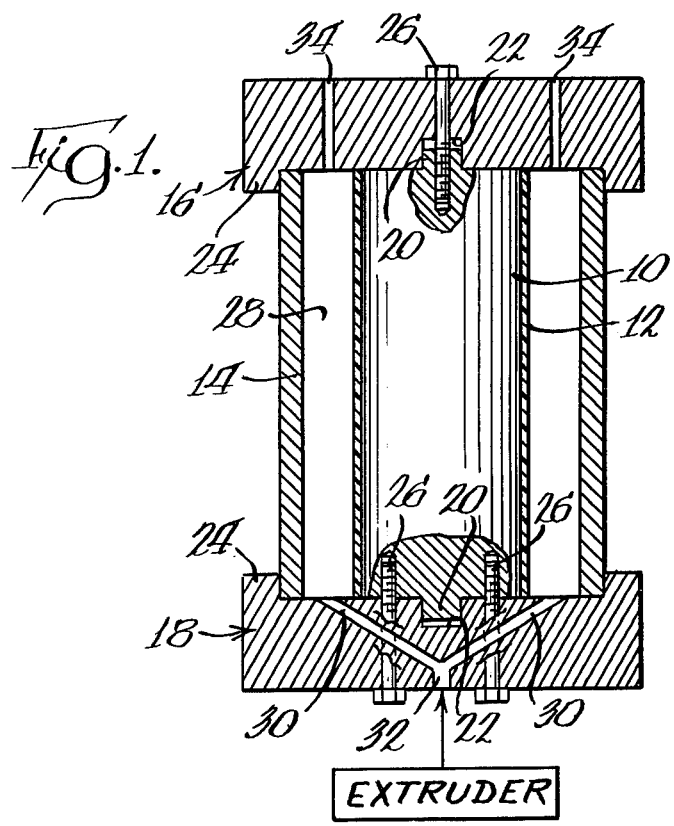
FIG. 1 is an elevational view, partly in section, of apparatus used in making the mold the present invention.

As illustrated in FIG. 1, in order to fabricate the mold, a mandrel 10 having an outer cylindrical surface is first prepared. The mandrel is preferably formed of a durable, rigid material that can be ground, polished or otherwise formed into a highly concentric cylindrical surface. Particularly suitable for this purpose are machinable metals or alloys such as steel, although other materials such as hard plastics may be used. The body of the mandrel may be solid or void containing, provided the outer surface is cylindrical and continuous.

Since the mandrel 10 is used repeatedly to make molds of the present invention, the surface thereof is subjected to whatever operation may be required to render it highly concentric and free from any surface irregularities that, if present, would cause a corresponding defect in the mold. If a steel surface is used, for example, the surface may be precision ground and polished. Although it is entirely possible to use mandrels having any desired surface shape to make a corresponding mold shape, the present invention will be described in connection with cylindrical surfaces.

After the mandrel is prepared, the elements of the mold are assembled. First, a tube of heat shrinkable polymeric material 12 having an inner diameter slightly larger than the outer diameter of the mandrel 10 is slipped over the mandrel. A sufficient amount of heat is then applied to the tube 12 and/or mandrel 10 in a conventional fashion in order to have the tube shrink down into intimate and uniform contact with the mandrel.

The material used for the tube is preferably one that is durable, flexible, resistant to heat after being heat shrunk, and also has good surface lubricity with respect to rubber that may be molded against its inner surface. The preferred material for this purpose is or contains polytetrafluoroethylene, which may be obtained commercially in the form of tubes having uniform wall thickness. Other similar flexible materials that may be used include polyfluorinated tetrafluoroethylene and/or hexafluoroepylene copolymers. Other potential materials include heat shrinkable forms of other polymers, such as polypropylene and polyamides. Composite sleeves, i.e., plastic sleeve coated with a release agent such as one of the materials described above, are also feasible. In order to render the tubes heat shrinkable, a conventional procedure is to heat and expand a tube, and then cool the tube in the expanded state. Upon reheating, the tube will shrink back to or near the original diameter.

The mold assembly also includes an outer hollow cylindrical shell 14 having an inner diameter larger than the outer diameter of sleeved mandrel. Any heat resistant, substantially rigid material may be used for the shell 14 such as a metal or plastic.

As shown in FIG. 1, in order to make the mold, the inner surface of the shell 14 is preferably roughened, such as by sand blasting and is coated with a suitable adhesive or primer. The outer surface of the sleeve 12 is treated such as by etching and coated with a primer. The primers used are conventional in nature and are selected to form a good bond with the rubber to be injected.

The mandrel 10 and sleeve 12 are then inserted in the shell 14, and means are provided for holding the mandrel in concentric relation with the shell. As shown, such means are preferably end caps 16 and 18 that embrace and hold the shell 14 and mandrel 10. The mandrel 10 may have axially projecting hubs 20 that are received in recesses 22 in the end caps. The outer shell 14 is held in position by virtue of annual shoulders 24 or recesses near the outer periphery of the end caps. Suitable means, such as bolts 26, may be used to hold the end caps on the assembly in substantially fluid tight relationship.

After the end caps 16 and 18 have been installed, an enclosed space 28 is defined between the shell 14 and the cover 12 on mandrel 10. Means are provided for filling the space 28 with a curable polymeric material, such as rubber. For this purpose, one of the end caps 18 is provided with inlet ducts 30 communicating between the space 28 and a common inlet 32 connected and sealed to the outlet of an extruder, shown schematically. The extruder is conventional and well known in the art and is capable of extruding uncured rubber such that the rubber is injected under pressure into the space 28. The opposite end cap 16 may be provided with vents 34 allowing passage of air and excess rubber.

The curable polymer is injected under pressure until the annular space 28 is completely filled, whereupon extrusion is discontinued. As the curable polymer is injected, it exerts pressure on the sleeve 12, causing the sleeve to be compressed even more tightly against the mandrel.

The assembly may be then removed from the extruder, and the injected polymer is allowed to cure, either with or without the application of heat to the assembly. Upon curing, the polymer bonds to the shell 14 and the sleeve 12, with the sleeve conforming exactly to the mandrel.

The polymer injected into the space 28 may be selected from a wide range of materials, and preferably a curable rubber or elastomer is employed. The material is selected to have sufficient heat resistance to conditions that may be encountered in making of rubber covered rolls. A very suitable material is silicone rubber, especially the type commonly referred to as high temperature vulcanization-type (HTV) silicone rubber. Other organic and synthetic rubbers are equally suitable, particularly those which are somewhat flexible and have thermal expansion characteristics similar to the material comprising the sleeve 12.

Figure 2:
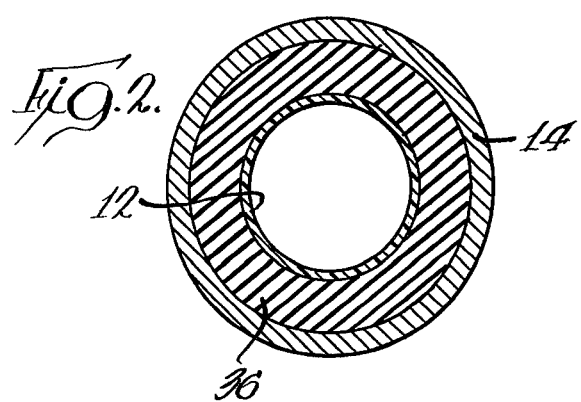
FIG. 2 is an end view of the mold of the present invention.

Upon curing of the elastomer and removal of the end caps 16 and 18 and mandrel, the mold is complete and an end view thereof is shown in FIG. 2. As a result of the foregoing process, the mold comprises the outer rigid shell 14, an inner cavity defining layer 12, and an intermediate elastomer layer 36 bonded between the inner and outer members and serving to support the precise concentricity of the inner layer.

It will be apparent from the foregoing that the mold of the present invention can be made from a variety of inexpensive materials, and the same mandrel may be used repeatedly to make any desired number of molds.

The mold of the present invention is particularly suitable for making metal core rolls coated with silicone rubber, including RTV (room temperature vulcanization), LTV (low temperature vulcanization) and HTV (high temperature vulcanization) rubbers. Such rolls enjoy widespread use in the copy machine industry, as well as other industries.

The method of using the mold is conventional and need not be repeated in detail herein. Basicly, an apparatus similar to that shown in FIG. 1 may be used, except that the core or shaft of the roll will be smaller in diameter than the mandrel 10, and the inlet ducts 30 will lead to the space between the core and the inner surface of the mold. Also, if liquid rubber is used, the extruder may be replaced by a pump.

The mold of the present invention offers further advantages not available from steel molds. Often, the mold will be heated to assist the curing of the rubber while making a rubber roll. Heating of the present mold will cause contraction of the inside diameter of the mold, and to a much greater degree than with a metal mold. Such contraction causes a slight amount of rubber to be squeezed out of the mold during heating. Upon return to room temperature, the inner wall of the mold will expand away slightly from the cured rubber roll surface, thus assuring release of the rubber roll from the mold. In any event, release is also facilitated because of the non-stick liner of the mold.

I claim:

1. A method for making a cylindrical mold comprising the steps of disposing a flexible tube of heat shrinkable polymeric material around a rigid cylindrical mandrel, disposing said tube covered mandrel in concentric relation within a rigid cylindrical shell having an inner diameter greater than the outer diameter of the tube covered mandrel, injecting a curable elastomer under pressure between the tube and the shell until any space therebetween has been filled, curing the elastomer to form a continuous elastomer layer bonded between said shell and said tube, and then removing the mandrel.

2. The method of claim 1 wherein said flexible tube is made of a material comprising polytetrafluoroethylene.

3. The method of claim 1 wherein said flexible tube is composed of a heat shrinkable material, and said tube is heat shrunk around said mandrel.

4. A composite mold having an inner cylindrical molding surface, said mold comprising an outer rigid cylindrical shell, an inner cylindrical tube of flexible material defining said molding surface and being spaced inwardly from the inner surface of said shell, and a layer of flexible cured polymeric material bonded between said shell and inner layer, said polymeric material and said shell serving to support said tube in a cylindrical configuration.

5. The composite mold to claim 4 wherein said inner tube comprises polytetrafluoroethylene.

6. The composite mold of claim 5 wherein said polymeric material comprises cured elastomer.

7. The composite mold of claim 6 wherein said cured elastomer comprises a silicone rubber.

* * * * *